United States Patent Office 3,013,972
Patented Dec. 19, 1961

3,013,972
GREASES THICKENED WITH POLYVALENT METAL SALTS OF 2(2-HYDROXY-3-CARBOXY-1-NAPHTHYLAZO) BENZENESULFONIC ACIDS
Norman R. Odell, Fishkill, and Joseph F. Lyons, Poughkeepsie, N.Y., assignors to Texaco Inc., New York, N.Y., a corporation of Delaware
No Drawing. Filed Aug. 6, 1959, Ser. No. 831,938
8 Claims. (Cl. 252—33)

This invention relates to improved lubricating greases and to a novel class of thickening agents therefor. More particularly, it relates to lubricating greases thickened with polyvalent metal salts of sulfonated azo coupled compounds.

We have found that certain polyvalent metal salts of sulfonic acid azo oxynaphthoic acid compounds form stable gels of grease-like consistency and very superior lubricating properties when they are dispersed in lubricating oils in suitable proportions. These compounds have unexpected advantages as grease thickening agents over other azo naphthol compounds, including the polyvalent metal salts of sulfonated aryl azo naphthol compounds disclosed and claimed as grease thickening agents in our copending application Serial No. 698,341, filed November 25, 1957, now U.S. Patent No. 2,908,644. In particular, they produce greases having a much smaller spread between unworked and worked penetrations, and they also have superior thickening properties in certain synthetic oils such as silicone oils.

The compounds which are employed as grease thickening agents in accordance with this invention are represented by the formula

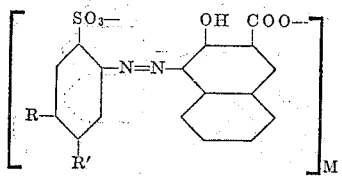

wherein R and R' represent hydrogen or non-salt forming, non-oil solubilizing groups such as lower alkyl or alkoxy groups containing from 1 to 3 carbon atoms, halogens or the nitro group, and M represents two hydrogen equivalents of a polyvalent metal. The preferred compounds are those wherein R and R' are lower alkyl groups or chlorine and M is an alkaline earth metal or manganese.

Examples of suitable compounds of the above class include the following: Ca salt of 2(2-hydroxy-3-carboxy-1-naphthylazo)-4-methyl-5-chlorobenzenesulfonic acid; Ba salt of 2(2-hydroxy-3-carboxy-1-naphthylazo)-4-methyl-5-nitrobenzenesulfonic acid; Sr salt of 2(2-hydroxy-3-carboxy-1-naphthylazo)-3-methylbenzenesulfonic acid; Mn salt of 2(2-hydroxy-3-carboxy-1-naphthylazo)-4-chloro-5-methylbenzenesulfonic acid; Ca salt of 2(2-hydroxy-3-carboxy-1-naphthylazo)-4-nitro-5-methoxybenzenesulfonic acid; and Mn salt of 2(2-hydroxy-3-carboxy-1-naphthylazo)-4-nitro-5-chlorobenzenesulfonic acid.

The above compounds are sold commercially as pigments and are readily obtainable by well known methods, such as by coupling 3-hydroxy-2-naphthoic acid with diazotized ortho-aminobenzene-sulfonic acid, and then converting the reaction product to the insoluble pigment by precipitation with a suitable polyvalent metal compound. A substrate such as alumina, titania, blanc fixe, etc., may be employed in the precipitation, or the pigment may be mixed with a material of this character to form a so-called extended toner. Where such materials are merely mixed with the pigment, they are generally employed in amounts less than about 25 percent by weight, based on the weight of the finished pigment. However, when the inorganic material is employed as a substrate, the amount present is not critical provided that sufficient of the pigment is present to substantially cover its surface.

The greases of this invention comprise essentially a lubricating oil as the major component containing sufficient amounts of a thickening agent of the class described above to impart at least substantial thickening. Ordinarily the composition will contain from about 10 to about 45 percent by weight of thickening agents of this type, and preferably about 20 to about 40 percent by weight of such thickening agents, based on the weight of the composition.

The grease preparation may be carried out by merely mixing together the thickener and any additives employed with the lubricating oil, employing any convenient means such as milling in colloid mill or in a paint mill to obtain a thorough dispersion of thickener and additives in the lubricating oil base. The mixing may be carried out at ordinary temperatures or at elevated temperatures such as up to about 300° F. in order to dissolve any difficultly soluble additives.

The lubricating oils employed may be any suitable oils of lubricating characteristics, including the conventional mineral lubricating oils, synthetic oils obtained by various refinery processes such as cracking and polymerization, and other synthetic oleaginous compounds. Suitable mineral oils include paraffinic and naphthenic oils having viscosities in the range from about 80 seconds Saybolt Universal at 100° F. to about 225 seconds Saybolt Universal at 210° F., and preferably those having viscosities in the range from about 100 to about 600 seconds Saybolt Universal at 100° F. For preparing high temperature greases, synthetic oils of various types, including particularly silicone oils and synthetic esters are preferably employed. Such oils may very advantageously comprise from about 50 up to 100 percent of the oil component of the grease, the remainder being mineral oil or other oil of a different type. Suitable synthetic esters include aliphatic diesters, such as di-2-ethylhexyl sebacate, di(secondary amyl) sebacate, di-2-ethylhexyl azelate, di-iso-octyl adipate, etc. A particularly suitable class of synthetic esters are the polyesters described in U.S. 2,628,974, obtained by reacting an aliphatic dicarboxylic acid with a glycol and a monofunctional aliphatic alcohol or acid. Suitable silicone oils include, for example, dimethyl silicone polymer, diethyl silicone polymer, methylcyclohexyl silicone polymer, diphenyl silicone polymer, methylphenyl silicone polymer, methylethyl silicone polymer, methyltolyl silicone polymer, etc., preferably having viscosities in the range from about 100 to about 600 seconds Saybolt Universal at 100° F. The halogen containing silicone oils, having a halogen content of at least about 2 percent, comprise a particularly preferred class of lubricating oils for this purpose.

Additives of the usual types may be employed in these greases, such as, for example, oxidation inhibitors, corrosion inhibitors, tackiness agents, extreme pressure agents, etc. Suitable oxidation inhibitors include particularly those of the amine type, such as diphenylamine, alpha-naphthylamine, beta-naphthylamine, para-phenylenediamine, and N,N'-diphenyl-p-phenylenediamine. A compound of this type may be present in an amount from about 0.5 to about 5 percent by weight, based on the weight of the composition. An oil soluble phosphorus acid ester may very advantageously be employed in conjunction with the amine in an amount from about 1 to about 10 percent by weight, based on the weight of the composition, to serve as a solvent and carrier for the amine. Also, additional thickening agents may be employed in minor amounts, such as other finely divided solids of various types and metal soaps of high molecular weight fatty acids such as are commonly employed as thickening agents in lubricating greases.

The following examples are given for the purpose of further disclosing the invention.

*Example I*

A lubricating grease representative of the greases of this invention is obtained by thickening a silicone oil with 26.3 percent by weight, based on the weight of the composition, of the calcium salt of 2(2-hydroxy-3-carboxy-1-naphthylazo)-4-chloro-5-methylbenzenesulfonic acid. The latter is employed in the form of particles below about 2.5 microns in diameter and having a major portion in the 0.1 to 1.0 micron range. The silicone oil is a methylchlorophenyl silicone oil sold by the General Electric Company under the trade name of Versilube F-50. Typical inspection tests upon this oil include a molecular weight of 2760, a silicon content of 33.6 percent and a chlorine content of 7.2 percent.

The grease preparation is carried out by mixing together the oil and thickener in suitable proportions employing an electric mixer and then passing the mixture through a Premier Colloid mill with 2 passes at 0.002 inch clearance.

A smooth N.L.G.I. No. 2 grade grease of buttery texture is obtained as described above, giving the following test results:

Penetration [1] at 77° F.:
  Unworked _____ 238
  Worked, 60 strokes_____ 266
Dropping point, °F_____ 500
ASTM bomb oxidation test (100 hrs. at 250° F.)
  lb. drop_____ 20
Dynamic water resistance test, percent loss_____ 0
Water absorption, percent_____ 60
Penetration of emulsion_____ 210
High temperature performance test, hrs. to failure
  at 450° F_____ 93

[1] Converted from ¼ cone, ⅓ worker used.

As shown by the above tests, the grease of our invention has a combination of superior lubricating properties, including high dropping point, satisfactory oxidation resistance for an uninhibited grease, and excellent water resistance. It also has superior high temperature performance properties as compared with the conventional soap thickened greases and with solids thickened greases of the usual types, as shown by an appreciable service life in the high temperature performance test at 450° F. The yield obtained in this preparation is substantially better than those obtained employing polyvalent metal salts of sulfonic acid azo naphthol compounds in this silicone oil, which require over 30 percent to form a grease of the same grade.

*Example II*

Another grease representative of the greases of this invention is obtained by thickening a synthetic ester oil with 33.6 percent by weight of the solid thickener employed in Example I. The synthetic ester oil is a product obtained by reacting sebacic acid, 2-ethylhexane-1,3-diol and 2-ethylhexanol in about a 2:1:1 ratio respectively, and consists predominantly of the compound (iso—$C_8H_{17}$)—OOC—($CH_2$)$_8$—COO—iso—
    $C_8H_{16}$—OOC—($CH_2$)$_8$—COO—(iso—$C_8H_{17}$)

The grease preparation is carried out substantially as described in Example I. Diphenylparaphenylenediamine is added to the grease mixture before milling in an amount equivalent to 1 percent by weight of the finished grease.

A smooth buttery grease is obtained as described above having a dropping point above 500° F. and a penetration at 77° F. (converted from a ¼ cone, ⅓ worker) of 275 unworked, and 260 worked, 60 strokes. It has very superior lubricating properties, including particularly excellent water resistance and high temperature performance properties. The related compounds obtained by employing naphthol instead of oxynaphthoic acid as the coupling compound produce greases of substantially equivalent properties when they are employed as thickening agents in this synthetic ester except that they have a spread of at least about 40 points, and usually about 100 points, between their unworked and worked penetrations.

*Example III*

Another grease representative of the greases of this invention is obtained as described above by thickening a mineral lubricating oil with the manganese salt of 2(2-hydroxy-3-carboxy-1-naphthylazo)-4 - methyl - 5 - chlorobenzene sulfonic acid. The latter is employed in the form of particles below about 2.0 microns in diameter and having a major portion in the 0.05 to 1.0 micron range. The mineral oil is a refined naphthenic distillate oil having a Saybolt Universal viscosity at 100° F. of about 330 seconds. The grease preparation is carried out as described in Example I.

A smooth buttery N.L.G.I. No. 1 grade grease is obtained as described above having a dropping point above 500° F. and very superior lubricating properties generally.

Obviously many modifications and variations of the invention, as hereinbefore set forth, may be made without departing from the spirit and scope thereof and only such limitations should be imposed as are indicated in the appended claims.

We claim:

1. A lubricating grease consisting essentially of a lubricating oil thickened to a grease consistency with a compound of the class represented by the formula

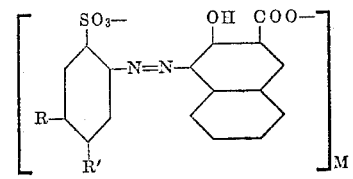

wherein R and R' are chosen from the class consisting of lower alkyl and alkoxy groups containing 1–3 carbon atoms, halogens and the nitro group, and M is a polyvalent metal.

2. A lubricating grease according to claim 1 wherein the said metal is chosen from the group consisting of alkaline earth metals and manganese.

3. A lubricating grease according to claim 1 wherein R is a lower alkyl group and R' is a halogen.

4. A lubricating grease according to claim 1 wherein R is a halogen and R' is a lower alkyl group.

5. A lubricating grease according to claim 1 wherein the said lubricating oil is an aliphatic dicarboxylic acid polyester.

6. A lubricating grease according to claim 1 wherein the said lubricating oil is a silicone oil.

7. A lubricating grease according to claim 6 wherein the said silicone oil is a methylchlorophenyl silicone oil.

8. A lubricating grease consisting essentially of a lubricating oil thickened to a grease consistency with the calcium salt of 2(2-hydroxy-3-carboxy - 1 - naphthylazo) - 4 - chloro-5-methylbenzenesulfonic acid.

References Cited in the file of this patent

UNITED STATES PATENTS

| | | |
|---|---|---|
| 2,679,480 | Brannen et al. | May 25, 1954 |
| 2,848,417 | Armstrong et al. | Aug. 19, 1958 |
| 2,880,176 | Roach et al. | Mar. 31, 1959 |
| 2,880,177 | Lyons et al. | Mar. 31, 1959 |
| 2,892,776 | Lyons et al. | June 30, 1959 |
| 2,908,644 | Odell et al. | Oct. 13, 1959 |
| 2,915,470 | Armstrong et al. | Dec. 1, 1959 |